(12) United States Patent
LaLonde et al.

(10) Patent No.: US 8,773,448 B2
(45) Date of Patent: Jul. 8, 2014

(54) LIST TEXTURE

(75) Inventors: Paul LaLonde, Victoria (CA); Kiril Vidimce, San Francisco, CA (US); Larry Dean Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 12/757,555

(22) Filed: Apr. 9, 2010

(65) Prior Publication Data

US 2011/0249011 A1 Oct. 13, 2011

(51) Int. Cl.
*G06T 1/20* (2006.01)
*G06T 1/00* (2006.01)
*G09G 5/00* (2006.01)
*G06F 7/00* (2006.01)
*G06F 17/30* (2006.01)

(52) U.S. Cl.
USPC ........... 345/506; 345/522; 345/629; 707/791; 707/800

(58) Field of Classification Search
None
See application file for complete search history.

(56) References Cited

U.S. PATENT DOCUMENTS

| 5,990,904 | A  | * | 11/1999 | Griffin | 345/631 |
| 6,999,100 | B1 | * | 2/2006 | Leather et al. | 345/611 |
| 7,564,456 | B1 | * | 7/2009 | Lindholm et al. | 345/426 |
| 2002/0070951 | A1 | * | 6/2002 | Wilkinson et al. | 345/629 |
| 2004/0212619 | A1 | * | 10/2004 | Saito et al. | 345/441 |
| 2006/0005191 | A1 | * | 1/2006 | Boehm | 718/100 |
| 2007/0165035 | A1 | * | 7/2007 | Duluk et al. | 345/506 |
| 2009/0109219 | A1 | * | 4/2009 | DeCoro et al. | 345/423 |

* cited by examiner

*Primary Examiner* — Maurice L McDowell, Jr.
*Assistant Examiner* — Donna J Ricks
(74) *Attorney, Agent, or Firm* — Blakely, Sokoloff, Taylor & Zafman LLP

(57) ABSTRACT

A method, apparatus, and system are described for list texturing being performed over a data path of a graphics pipeline. Input data is received at a graphics pipeline of a graphics processing unit to be processed and generated into a final image to be displayed on a display device of a computer system. Geographic primitives are obtained from processing the input data, and neighbor aggregation of pixels within the geographic primitives is performed. The neighbor aggregation of the pixels includes rendering list texture of the pixels by merging the geographic primitives.

20 Claims, 5 Drawing Sheets

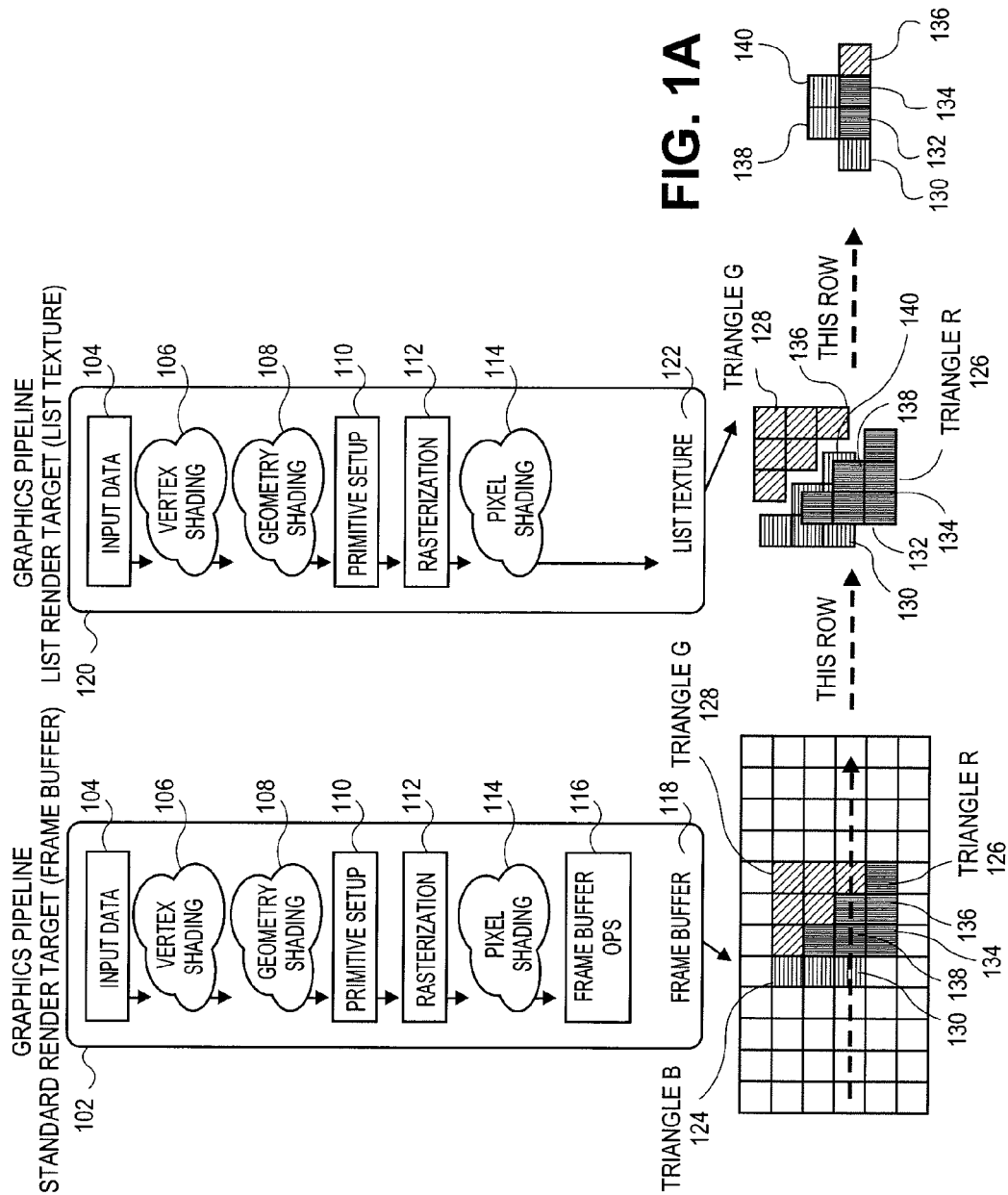

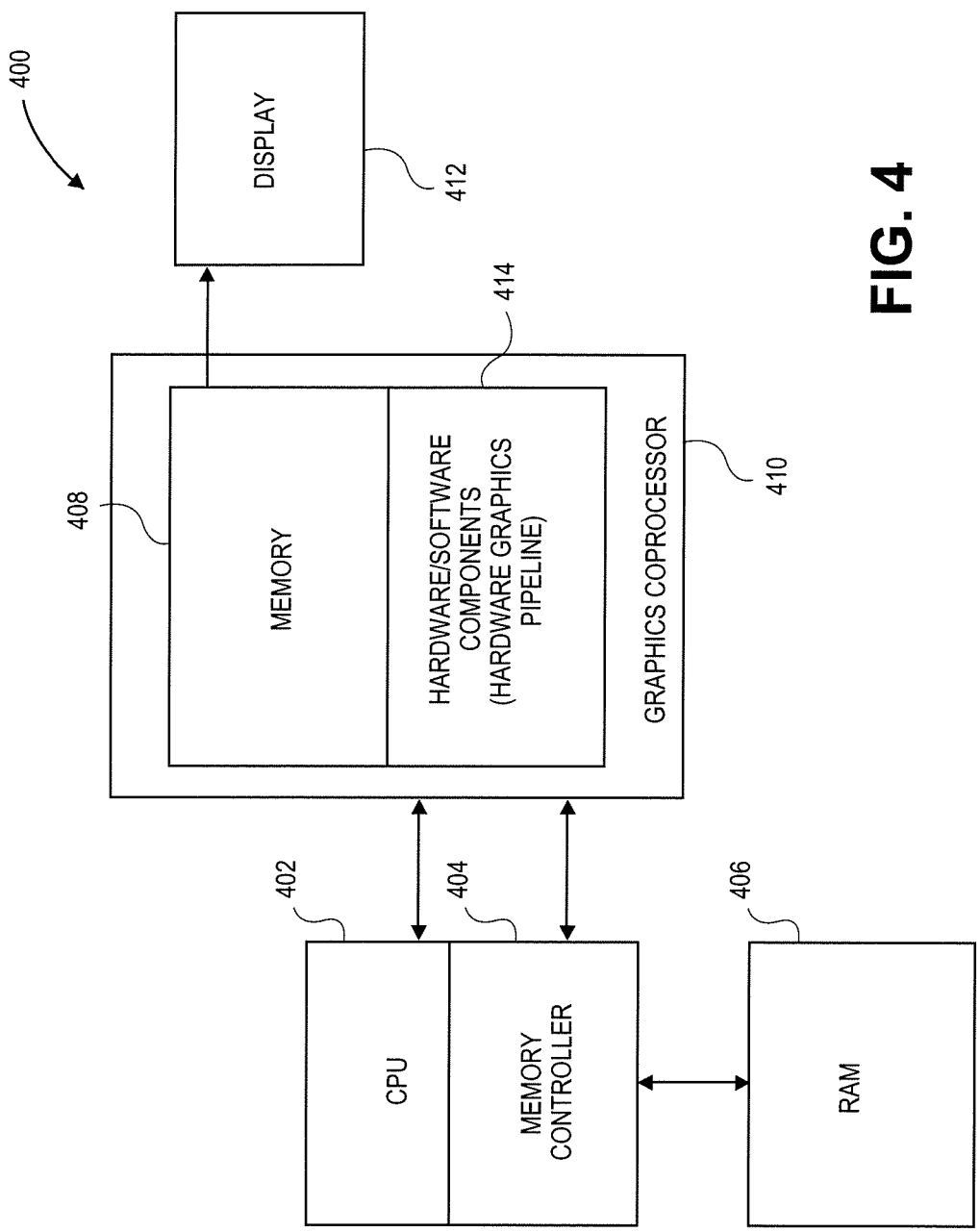

LIST TEXTURE

FIELD

The field relates generally to the computing sciences and, more particularly, to computer graphics.

BACKGROUND

In computer graphics, the use of a graphics pipeline is well-known. The graphics pipeline refers to a rasterization-based rendering that is supported by graphics hardware. The graphics pipeline typically accepts some representation of a three-dimensional (3-D) scene as an input and transforms the 3-D image into a 2-D raster image as an output to be displayed on a 2-D display screen. This transformation is performed in stages starting with processing information provided as properties at vertices or end points or control points of geometric primitives describing what is to be referenced. These geometric primitives include lines and triangles, while the properties per vertex include Red Green Blue (RGB) values, x-y-z coordinates, reflectivity, translucency, etc. The two conventional graphics pipelines include OpenGL and Direct3D.

The graphical pipeline operates like a stream process (like a central processing unit (CPU) pipeline architecture) in taking large tasks and breaking them down into smaller portions and stages, which allows the graphical pipeline to handle multiple things at once, making the overall clock speed equivalent to the slowest for those stages. Using conventional techniques, the graphic pipeline is mapped to graphics acceleration hardware such that the input to the graphics processing unit (GPU) in a graphics card is in the form of vertices, which then undergo transformation and other per-vertex processing followed by clipping and rasterization to form fragments. The final pixel values obtained from theses fragments are then outputted to the frame buffer for display. Further, each of the vertices and fragments are considered independent and this way, all states of the graphics pipeline can be used simultaneously for various vertices and fragments as they are processed though the pipeline.

Typical graphics pipelines require transparent fragments to be sorted prior to entry into the pipeline in order to be rendered correctly. These pipelines are sometimes augmented to employ special purpose hardware that supports lists of fragments for transparency. These solutions are extremely expensive and limited in their capabilities and thus, they provide a very limited application. For example, some current solutions for GPUs store the same number of translucent fragments for each pixel, which restricts these solutions to very uniform problems with small, fixed, and upper bounds on the lengths of the lists (e.g., 4 or 8). Further, these solutions require dedication of storage to "empty" lists and thus, processing these empty lists is extremely inefficient and wastefully consumes the system's memory and bandwidth. Some of these current solutions take over memory reserved for multi-sample anti-aliasing (MSAA) to store multiple fragments per pixel, which makes it impossible to use MSAA and multiple fragments in the same application.

BRIEF DESCRIPTION OF THE DRAWINGS

Embodiments of the present invention are illustrated by way of example and not by way of limitation in the figures of the accompanying drawings, in which like references indicate similar elements and in which:

FIG. 1A illustrates an embodiment of a graphics pipeline list render target that renders to both normal render targets and list textures;

FIG. 4 illustrates an embodiment of a computing system having a graphics pipeline implemented as a hybrid of software and hardware components.

DETAILED DESCRIPTION

Figure 1B:
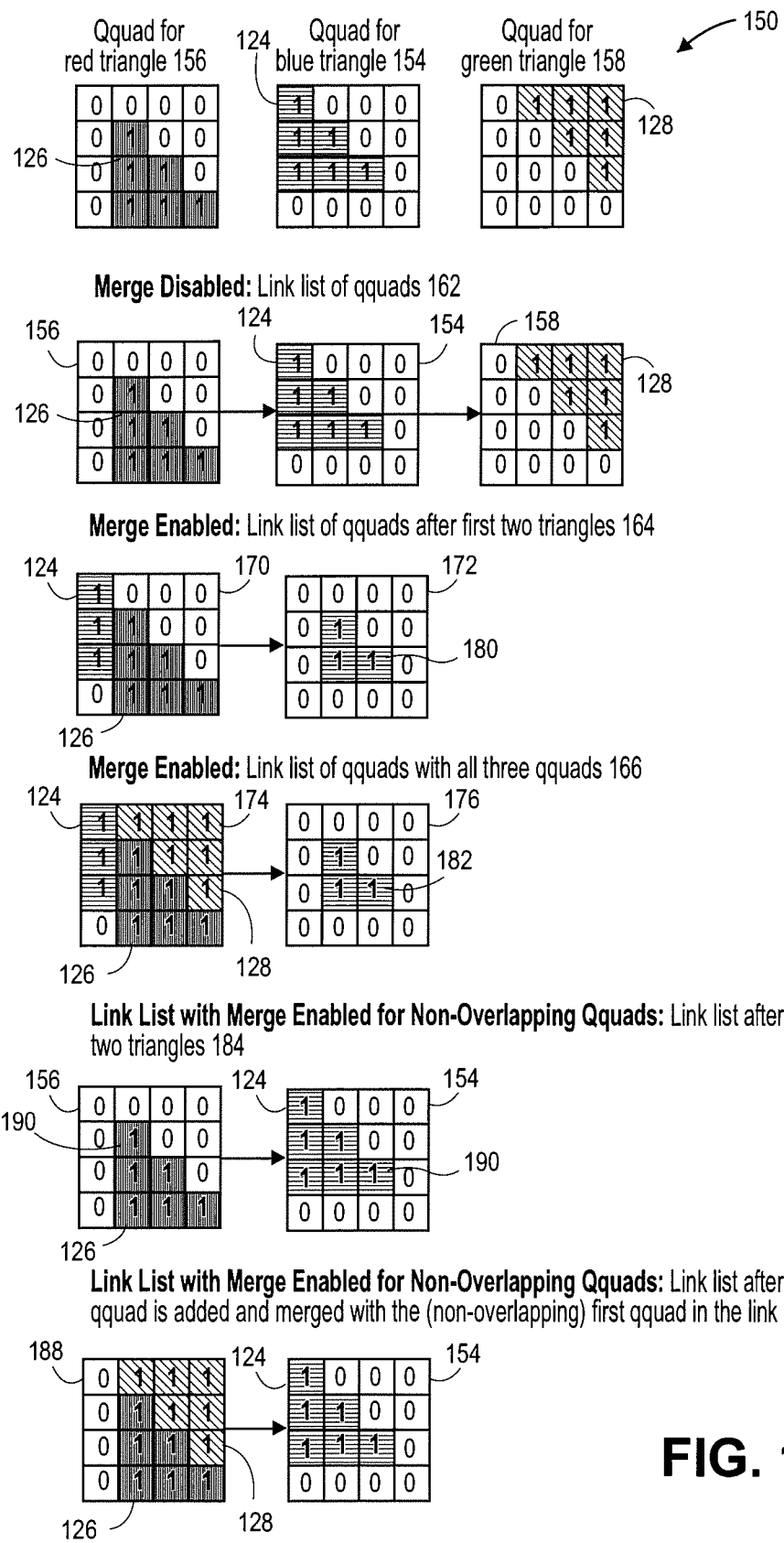
FIG. 1B illustrates an embodiment of neighbor aggregation including a set of qquads (4×4 pixel regions) having the three triangles of FIG. 1A.

In one embodiment, efficient solutions for a graphic pipeline that supports storing a variable number of fragments per pixel and are compatible with any number of applications are provided. For example, these solutions include novel list modification and full programmable resolve techniques. Further, specific methods for storing and accessing various lists are provided. For example, any number of list elements may be stored in a novel data structure whose size at any pixel is closely related to the actual number of elements with low overhead and also supports high variation in list length at different pixels. Support for this novel data structure in the fragment shader language allows the programmer to express his task instead of manipulating the mechanics of the data storage and managing overflows of the data structure. The data structure having a strong data locality is compatible with various cache architectures. The technique described here and elsewhere in the document can also be used together with multi-sampling.

In a graphics pipeline, input data is received which generally comes from the system memory in the application data space, but may come from other sources as well. For example, it can be generated directly by the CPU, or stored in the graphics device itself. The data is transmitted to the graphics pipeline through a hardware interface. Then, various processes are performed to transform the data, such as converting coordinates from model space to screen space, including clip testing and any clipping operations, primitive setup involving computing the slopes of the edges of the triangle as well as the gradients (changes in the X and Y directions) of the depth, color, and texture parameters. The setup algorithm is matched with the rasterization algorithm used. Rasterization involves finding all valid pixel samples for a triangle and computing the correct depth, color and texture value at each sample point.

FIG. 1A illustrates an embodiment of a graphics pipeline 102 that processes both normal render targets and list textures. The processes of data input 104, vertex shading 106, geometry shading 108, primitive setup 110, and rasterization 112 are common to the two types of data. Differences between processing normal render targets and list textures occur in the pixel shading 114 and Frame Buffer Ops 116 stages. Standard render targets lead to frame buffer 118, while, in one embodiment, list render targets provide list texture 122.

As illustrated, when rendering pixels using standard tender target 102, as shown in row 130 of the frame buffer 118, merely four pixels 130-136 of the three triangles B 124, R 126, G 128 are captured. This is because in a standard render target, each storage location can only store data from one triangle. In contrast, in one embodiment, using the list texture 122 of the list render target 120, all 6 pixels 130-140 (of row 130) are captured. As illustrated, two pixels 132 and 134 of triangle R 126, one pixel 136 of triangle G 128, and three pixels 130, 138 and 140 of triangle B 124 are captured by storing data from both triangle R 126 and triangle B 124 at two of the pixels in row 130. The logical stacking of data at the same pixel location may be implemented in many ways, including linked lists. In one embodiment, linked list creation is done at a granularity of the width of a vector processor that can process 16 chunks of data at a time. As a result, the pixels are grouped into 4×4 chunks that are referred to as qquads.

Throughout this document, the term "qquad" 204 is used in accordance with the shape and size (of 4×4 pixels) of the object used here merely as an example and for brevity and clarity. Hence, it is contemplated that the embodiments of the present invention are not limited to qquads 204

FIG. 1B illustrates an embodiment of neighbor aggregation 150 including a set of qquads 154-158 having the three triangles 124-128 of FIG. 1A. Here, and throughout this document, neighbor aggregation is presented as 4×4 qquads for consistency, clarity, and brevity; however, it is contemplated that the novel technique of neighbor aggregation is not limited to 4×4 qquads and that it can involve different shapes, forms, and sizes. In one embodiment, as illustrated, each of the three triangles B 124, R 126 and G 128 is provided within a single corresponding qquad 154, 156 and 158, respectively. The 0's and 1's in these qquads 154-158 describe the bit mask associated with the qquad 154-158, such as 0 meaning "pixel not present" and 1 meaning "pixel present". Each pixel in a qquad 154-158 has an associated payload (e.g., data) which, in this particular case (for example), includes RGBA (red/green/blue/alpha) value, but it is contemplated that any other ancillary data (e.g., depth, such as distance from the camera) or other similar values that are used to render the final image may be included in the payload.

As illustrated, while the qquad 154-158 merging is disabled 162, a list link of the qquads 154-158 is established to link qquad 154 with qquad 156 which is then linked with qquad 158. When the qquads merging is enabled 164, the first qquad 154 and merged with the second qquad 156 into qquad 170 having triangles B 124 and R 126 and resulting in qquad 172 having pixels 180. With further merging 166, the three qquads 154-158 merged together having the three triangles 124-128 as illustrated in the merged qquad 174 resulting in qquad 176 having pixels 182. In one embodiment and as illustrated, with qquad merging 164, 164, mask changes (e.g., the number of 0's and 1's) occur as each triangle 124-128 is merged with or added to another.

FIG. 1B illustrates another embodiment according to which merging occurs if the new triangle does not overlap any pixels where data is already present in the topmost aggregation in the linked list. This merging technique could be more efficient under certain circumstances. As illustrated, when the merging of qquads 154, 156 is enabled 184, overlapping of some of the pixels 190 of the two corresponding triangles 124, 126 is expected (or occurs) and thus, the two qquads 154, 156 are not merged and rather a link between the two qquads 154, 156 is established. In contrast, when the merging of qquads 154, 158 is enabled 186, no overlapping of any of the pixels of the two corresponding triangles 124, 128 is expected (or occurs) and thus, the two qquads are merged into a new qquad 188, as illustrated, while a link between qquad 188 and qquad 154 is maintained. Qquad 188 stores triangles 126, 128 of qquads 156, 158 (without having any overlapping or conflicting pixels between triangle 126 and 128), while qquad 154 holds only one triangle 124 (because of its conflict or overlapping pixels 190 when merging with qquad 156 and its triangle 126); hence, a link is maintained between qquad 188 and qquad 154. This merging technique can increase the number of qquads in the linked list, but it reduces the complexity of merging, since the aggregating process merely considers the topmost qquad of the link list. Further, it is very efficient in the common case where a large number of triangles tessellate a surface, so that they only overlap when the surface folds under itself.

Figure 2:
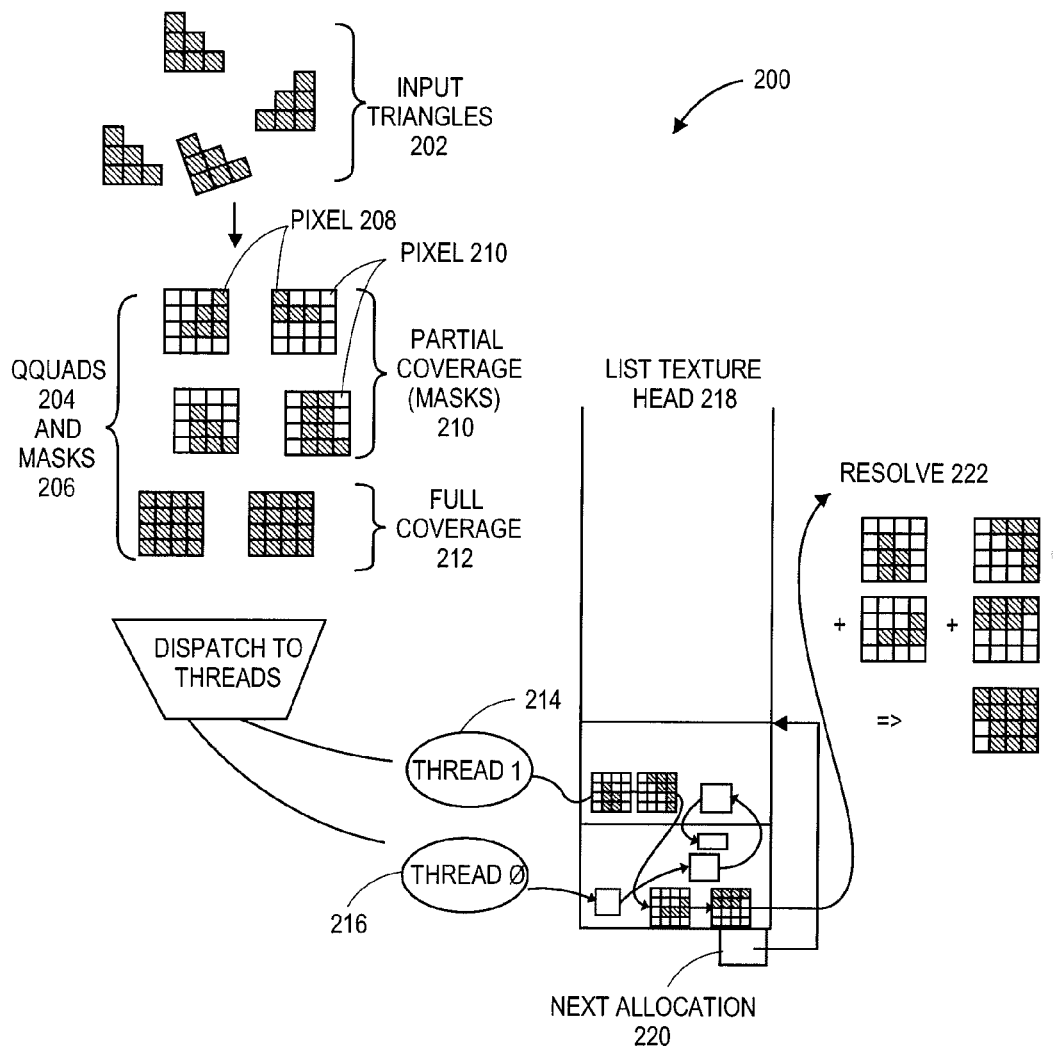
FIG. 2 illustrates an embodiment of a list texture mechanism.

FIG. 2 illustrates an embodiment of a list texture mechanism 200. In one embodiment, the mechanism 200 further provides a space-efficient representation of the list of fragments at a given pixel location which is then aggregated with neighboring pixels, herein referred to as qquads 204. In one embodiment, the mechanism 200 provides a shader compiler extension allowing a list texture to be bound to a particular output of the fragment shader. Any values written to that output are accumulated into a fragment list for that pixel according to a state specified within a set of state extensions for the rasterization pipeline that controls how new fragments are added to a list texture (e.g., in-order, sorted, sort direction, etc.). This sorting can occur as fragments are added or can be deferred to later, depending which is more efficient in a particular implementation. Further, the shader compiler is responsible for ensuring that the data written matches the layout format of the list texture that is described at initialization, such as per-pixel, per-fragment storage need is described and declared, which can be declared using a full structure declaration, allowing more type safety in the implementation.

Although the user interface provided at the resolve stage (resolve shader) 222 is of a single list of fragments at a given pixel 208, a fixed aggregation of neighboring pixels (qquad) 204 coupled with a mask indicating which values are present (indicated as a 1) and which might have never been supplied (indicated as a 0). The neighbor aggregation 204 may be made fixed to the same layout as the one used by the rasterizer in the mechanism 200; for example, the SIMD width used by the resolve shader compiler to aggregate neighboring pixels (in a qquad) 204. By using the same layout, the list texture functionality integrates easily with an existing graphics (rendering) pipeline of the mechanism 200. Since not all pixels 210 considered in a shader invocation (of this aggregate of neighboring pixels 204) necessarily generate values for the list texture, the pixels 208 that are added have their "presence mask" marked with a "1", while those pixels 210 that are not added are marked with a "0". This mask is also used in the resolve stage 222 during any sorting performed at when during insertion mode (further described later).

The start of each list texture chain is stored as a pointer in a 2-dimensional array whose dimensions correspond to the number of aggregations that fit in each dimension; for example, when using qquads, the requested X and Y coordinates of a pixel 208 are divided by 4 to find the indices to look up in this array. Although these embodiments are described in terms of pointers, an index-based scheme can be more compact and useful (e.g., pointers are 64 bits in this document, but 32 bit indices would be more than sufficient to address a list texture).

The resolve stage 222 provides the capability for resolving list textures into ordinary render targets that can be added to a traditional/standard (graphics) rasterization pipeline. The resolve stage 222 further includes a shader compiler extension for accessing the fragments in the list, including modifying or deleting the fragments. The resolve stage 222 runs a user shader to perform the task of converting the fragments at a pixel 208 into a single output, such as a single screen color and opacity. The resolve shader stage 222 extends a typical fragment shader by adding a mechanism to read any particular fragments of the input list texture, as well as modifying or deleting any fragments. This read is restricted to reading from the pixel at which the shader is invoked. This allows either indexed access (e.g., provide fragment k) or through an iterator (provide the next fragment). Upon receiving such an instruction, the shader compiler queries the list texture for the requested fragment, tracking the presence mask, as aforementioned. If the mask is not set, that SIMD lane is masked from further consideration in that iteration of the shader invocation. If the mask is set, computation continues, having returned the values stored in the list texture at that fragment. For example, fragments at a particular pixel may be accounted for by counting how many present mask bits are set. If for a particular pixel the masks are 1011, three fragments are counted, while the read of the second ("0") fragment may cause that iteration of the loop that is reading the list texture to be skipped for that pixel.

In one embodiment, the mechanism 200 further provides a set of state extensions for the graphics rasterization pipeline that controls how new fragments are added to a list texture (e.g., in-order, sorted, sort direction, etc.). The list texture may support multiple insertion modes, such as in one mode, fragments are added in an arbitrary order (such as first come, first served or irrespective of submission order, etc.), in a retirement order (e.g., traditional rasterization pipeline submission order), in a front-to-back order (such as sorted on some identified segment of the list texture data structure), or in a back-to-front order (e.g., idem). The implementation technique of this technique and the insertion modes are further described later. The use of a particular sort mode may make the logic for the resolve shader considerably more efficient for opacity accumulation than forcing the resolve shader to perform the sort.

A lock-free memory allocation scheme for efficient allocation of the qquads 204 from multiple threads 214, 216 is provided. Shading and the relevant fragment accumulation into the list texture happen in parallel. This is a novel allocation scheme in which a memory pool allocated for the list texture is broken into pages. Each thread 214, 216 retrieves a working page from the memory pool using a compare-and-swap loop (incrementing the pointer to the highest used memory when successful) and qquads 204 are allocated, as needed, linearly within each page, by the thread 214, 216 that owns the page such that no further locking is required. The page size may be multiple of the size of a qquad data structure declared for a particular list texture.

Furthermore, an optimization process is provided that packs neighboring sparse partially-filled non-overlapping aggregates 210, improving coherence. When inserting the fragments into the list texture, these fragments are typically part of a given primitive and these primitives frequently do not cover an entire SIMD aggregation of pixels (qquads) 204 and which of these fragments are present is indicated by the presence mask (e.g., marked by "1"). For many rendering situations, a neighboring primitive may abut the first one, providing a disjoint presence mask. Such two aggregates may be joined or merged as long as their presence masks are disjoint. This novel optimization process is used to join such aggregates, such as being from adjacent primitives the fragments frequently share similar control paths in later shader invocations (including the resolve shader at the resolve stage 222) and this joining of the aggregates reduces the total number of loops required to examine an entire fragment stack for a particular aggregate.

The mechanism 200 further facilitates ordering fragments at a pixel location at an insertion time in a thread-safe manner. The insertion modes described earlier employs efficient insertion modes in multi-threaded contexts. List textures are written to from multiple execution threads 214, 216 (many threads cooperate in preparing a tile) such that the aggregates (qquads) 204 can be sent to these threads 214, 216 for further processing because using a global lock (or even a lock per aggregate chain) may cause considerable contention on insertion. Instead, in one embodiment, the list texture mechanism 200 uses lock-free linked list data structures to mediate the insertions. For example, for in-order insertions, scoreboarding is used as used in tiled renderers to limit the insertion of conflicting fragments until after the completion of the current fragment. For unordered insertions, a simple compare-and-swap loop is used to guarantee that any insertion into the linked list is executed correctly (however, any orderings of insertion is acceptable). For sorted insertions, chained compare-and-swap operations are used to move a fragment from its inserted location (from front or back of the chain) to its desired location. Also, multiple fragments can be in flight in the same chain, having their walk forward/backward through the chain being is guarded by the CAS logic.

Figure 3:
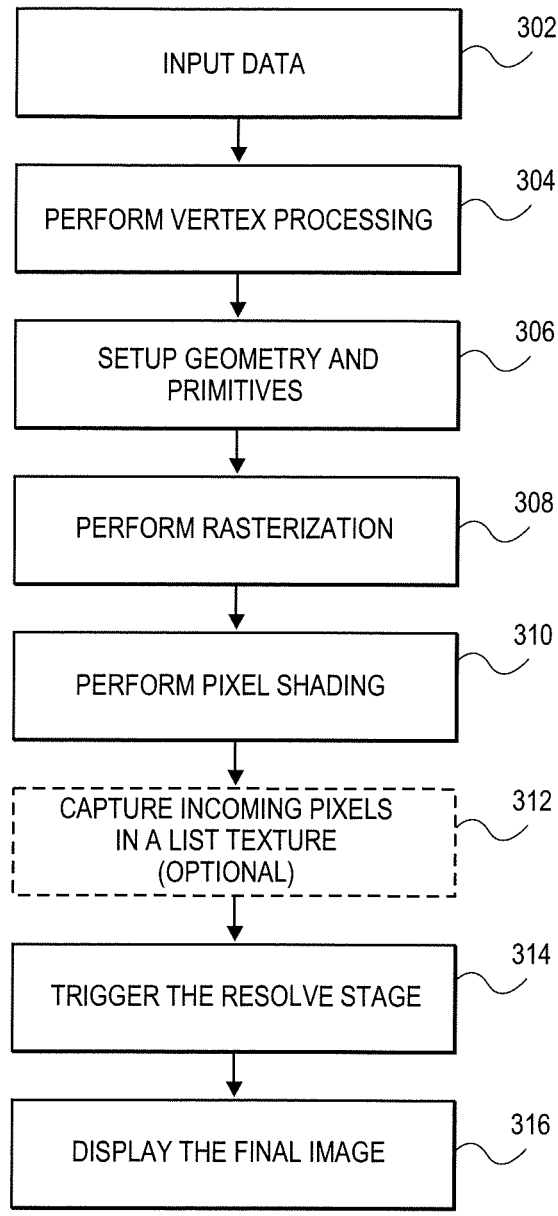
FIG. 3 illustrates an embodiment of a process for list texturing in a graphics pipeline in a graphics processing unit.

FIG. 3 illustrates an embodiment of a process for list texturing in a graphics pipeline in a GPU. Typically, in a graphics pipeline, billions of geometric calculations/second are performed with each stage of the graphics pipeline performing its assigned calculations until an image is rendered on a display device. At processing block 302, input data (objects) associated with a graphics application is received through a peripheral bus (e.g., PCI, AGP) via a bus interface. At processing block 304, vertex processing is performed including converting each vertex into a 2-D screen. For example, a vertex shader performs vertex shading that enables custom transformations for effects such as deformations or warping of a shape. This vertex processing further includes removing any parts of the image that are not likely to be visible on a 2-D screen (e.g., any geometry that is not going to be visible within the camera view frustum or back facing geometry that has been rendered with back face culling turned on) to expedite the rendering process by eliminating any unnecessary rasterization and post-processing on those primitives that are not likely appear in the final image. At processing block 306, geometric shading and primitive setup are performed. In primitive setup and geometric shading stages, vertices are collected and converted into triangles and new primitives may be generated from those that were sent in the beginning. Further, additional information is generated to facilitate subsequent states in the graphics pipeline to accurately generate any attributes associated with each pixel (or fragment) of each triangle.

After the vertex processing is performed on the object, at processing block 308, rasterization is performed. Rasterization is the process by which a vector graphics format or shapes image is converted into raster format (e.g., raster images or pixels or dots) for outputting on a display device or a printer or storing as a bitmap file; further, the correct resulting pixel values are determined. At processing block 310, pixel shading of the image is performed. This pixel shading process assigns final colors to the fragments or pixels of the triangle; for example, a programmable pixel shader enables the combining of pixel attributes (e.g., color, depth, position of an image on the screen). Pixel shader block 310 can produce data for a standard render target, data to add to a list texture, or both. This figure describes specifically its use for producing list texture data.

Then, the incoming pixels (from the shading stage) are captured at processing block 312. Further, the qquads come out of the rasterizer and the entire backend operates on qquads. The qquads exist until the pixels are written out in the backend after the pixel shading and frame buffering operations are performed (both when listed textures are used and when they are not used). At processing block 314, in one embodiment, the resolve stage is triggered, which runs a resolve shader to convert the fragments at a pixel into a single output that is typically a single screen color and opacity. The resolve shader iterates over each pixel and sorts, if necessary, and composites final values. In another embodiment, this operation of processing block 314 is optional, such as there is not necessarily a separate resolve stage in the graphics pipeline. The resolve phase may be implemented merely by performing another pass and rendering a quad of geometry aligned with the camera (e.g., a full screen quad) and then running a pixel shader for each pixel in the quad (e.g., every pixel on the screen). This resulting pixel shading is referred to as a "resolve pass". Hence, the resolve shader phase of block 314 may or may not be employed. At processing block 316, the final image is displayed on a display screen, printed using a printer, or saved as bitmap image.

FIG. 4 illustrates an embodiment of a computing system 400 having a graphics pipeline in implemented as a hybrid of software and hardware components 414. Certain functionality of the graphics pipeline is implemented in hardware, and certain functionality is implemented in software. A graphics pipeline may be implemented in a graphics coprocessor design, where a CPU chip is designed to work with a graphics coprocessor 410 (graphics processing unit (GPU)). In embodiment, graphics coprocessor 410 employs any number of conventional software and hardware logic to perform the conventional functions relating to graphics rendering as well as a number of novel software and hardware logic 414 to perform the novel functions for graphics rendering as disclosed throughout this document. For example, graphics coprocessor 410 may employ a novel neighbor aggregation logic to perform the novel neighbor aggregation process, a novel resolve logic to perform the novel resolve functionalities, and the like.

A random access memory (RAM) 406 comprises application database having object information. A memory controller 404 accesses data in RAM 406 and forwards to a CPU 402 for graphics pipeline processing. RAM 406 may include double data rate RAM (DDR RAM), extended data output RAM (EDO RAM) etc. CPU 402 interacts with a hardware graphics pipeline 414 to share graphics pipelining functionality. Processed data is stored in a buffer in the hardware graphics pipeline 414, and state information is stored in memory 408. The resulting image is then transferred to a display 412. Alternatively, a graphics controller on the same die as a CPU 402, and sharing the cache and memory controller may be used. Display 412 may be of various types, such as Cathode Ray Tube (CRT), Thin Film Transistor (TFT), Liquid Crystal Display (LCD), DPL, etc.

In one embodiment, some processes of the graphics pipeline as described above are implemented in software, while the rest are implemented in hardware. Memory 208 may comprise a pre-allocated region of a buffer (e.g., frame buffer); however, it should be understood by one of ordinary skill in the art that the invention is not so limited, and that any memory accessible to the lower graphics pipeline may be used. Computer system 400 may further includes an input/output (I/O) control hub (ICH), one or more I/O devices, etc.

CPU 402 may include one or more processors to execute instructions in order to perform whatever software routines the computing system implements. The instructions frequently involve some sort of operation performed upon data. Both data and instructions are stored in system memory 408 and any associated cache. Cache is typically designed to have shorter latency times than system memory 408; for example, cache might be integrated onto the same silicon chip(s) as the processor(s) and/or constructed with faster static RAM (SRAM) cells whilst the system memory 408 might be constructed with slower dynamic RAM (DRAM) cells. By tending to store more frequently used instructions and data in the cache as opposed to the system memory 408, the overall performance efficiency of the computing system 400 improves.

System memory 408 is deliberately made available to other components within the computing system 400. For example, the data (e.g., input graphics data) received from various interfaces to the computing system 400 (e.g., keyboard and mouse, printer port, Local Area Network (LAN) port, modem port, etc.) or retrieved from an internal storage element of the computer system 400 (e.g., hard disk drive) are often temporarily queued into system memory 408 prior to their being operated upon by the one or more processor(s) in the implementation of a software program. Similarly, data that a software program determines should be sent from the computing system 400 to an outside entity through one of the computing system interfaces, or stored into an internal storage element, is often temporarily queued in system memory 408 prior to its being transmitted or stored.

An ICH may used for ensuring that such data is properly passed between the system memory 408 and its appropriate corresponding computing system interface (and internal storage device if the computing system is so designed) and may have bi-directional point-to-point links between itself and the observed I/O devices. Memory controller 404 may be used for managing the various contending requests for system memory 408 accesses amongst the CPU 402, interfaces and internal storage elements that may proximately arise in time with respect to one another.

One or more I/O devices are also implemented for transferring data to and/or from the computing system 400 (e.g., a networking adapter); or, for large scale non-volatile storage within the computing system 400 (e.g., hard disk drive).

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:
1. A method comprising:
receiving input data relating to an image in a graphics pipeline of a graphics processing unit (GPU) to be processed and generated into a final image to be displayed on a display device of a computer system;

obtaining geographic primitives from processing the input data, wherein obtaining geographic primitives includes vertex processing, wherein the vertex processing includes converting a vertex associated with the input data into a screen and facilitating vertex shading to enable custom transformations for effects of a shape, wherein the effects include deformation of the shape or warping of the shape, predictively removing, based on vertex shading, one or more parts of the image that are not expected to be visible in the final image, and predictively eliminating, based on predictively removing, unnecessary rasterization and post-processing of one or more primitives that are not expected to appear in the final image, wherein predictive removal and predictive elimination are performed to dynamically adjust a data structure's size such that for each pixel, the data structure's size remains equal to an actual number of elements having low overhead and supporting high variation in list length at different pixels; and performing neighbor aggregation of pixels within the geographic primitives, wherein the neighbor aggregation of the pixels includes rendering list texture of the pixels by merging the geographic primitives.

2. The method of claim 1, wherein predictive removing is facilitated based on vertex shading, being performed at an early stage in the graphics pipeline, and without having to perform a workload reduction test, the method further comprising:

resolving the neighbor aggregation of the pixels to convert the pixels into a single output to be displayed as the final image on the display device, wherein resolving further comprises iterating the pixels to perform one of more of deleting, modifying, sorting one or more of the pixels to generate a final composite value associated with the pixels to be used to convert pixels into the single output.

3. The method of claim 1, further comprising generating, in communication with the neighbor aggregation, a numerical indication of whether a pixel is present or not in the neighbor aggregation, wherein the numerical indication includes a first number indicating the pixel being present and a second number indicating the pixel being absent, wherein each pixel is associated with one or more sets of data including one or more of red/green/blue/alpha (RGBA) values, ancillary data, and other data to be used in rendering the final image.

4. The method of claim 1, further comprising employing multiple insertion modes to function with multiple execution threads, wherein the list texture uses lock-free linked list data structure to mediate the multiple insertion modes, the multiple insertion modes including one or more of an in-order insertion mode, an unordered insertion mode, and a sorted insertion mode, wherein the method further comprises establishing list links to facilitate linking of two or more objects based on numerical indications and without having to encounter complexities associated with merging of objects, wherein the objects have various shapes.

5. The method of claim 1, further comprising employing multiple sorting modes to prevent resolution resources from being wasted on sorting, the multiple sorting modes including an arbitrary order mode, a retirement order mode, a front-to-back order mode, and a back-to-front order mode.

6. A system comprising:

first logic, at least a portion of which is implemented in hardware, to receive input data relating to an image in a graphics pipeline of a graphics processing unit (GPU) to be processed and generated into a final image to be displayed on a display device of a computer system;

second logic, at least a portion of which is implemented in hardware, to obtain geographic primitives from processing the input data, wherein obtaining geographic primitives includes vertex processing, wherein the vertex processing includes converting a vertex associated with the input data into a screen and facilitating vertex shading to enable custom transformations for effects of a shape, wherein the effects include deformation of the shape or warping of the shape, predictively removing, based on vertex shading, one or more parts of the image that are not expected to be visible in the final image, and predictively eliminating, based on predictively removing, unnecessary rasterization and post-processing of one or more primitives that are not expected to appear in the final image, wherein predictive removal and predictive elimination are performed to dynamically adjust a data structure's size such that for each pixel, the data structure's size remains equal to an actual number of elements having low overhead and supporting high variation in list length at different pixels; and neighbor aggregation logic, at least a portion of which is implemented in hardware, to perform neighbor aggregation of pixels within the geographic primitives, wherein the neighbor aggregation of the pixels includes rendering list texture of the pixels by merging the geographic primitives.

7. The system of claim 6, wherein predictive removing is facilitated based on vertex shading, being performed at an early stage in the graphics pipeline, and without having to perform a workload reduction test, the system further comprising resolve logic, at least a portion of which is implemented in hardware, to resolve the neighbor aggregation of the pixels to convert the pixels into a single output to be displayed as the final image on the display device, wherein the resolve logic is further to iterate the pixels to perform one of more of deleting, modifying, sorting one or more of the pixels to generate a final composite value associated with the pixels to be used to convert pixels into the single output.

8. The system of claim 6, further comprising masking logic, at least a portion of which is implemented in hardware, to generate a numerical indication of whether a pixel is present or not in the neighbor aggregation, wherein the numerical indication includes a first number indicating the pixel being present and a second number indicating the pixel being absent, wherein each pixel is associated with one or more sets of data including one or more of red/green/blue/alpha (RGBA) values, ancillary data, and other data to be used in rendering the final image.

9. The system of claim 6, further comprising multiple insertion modes to function with multiple execution threads, wherein the list texture uses lock-free linked list data structure to mediate the multiple insertion modes, the multiple insertion modes including one or more of an in-order insertion mode, an unordered insertion mode, and a sorted insertion mode, wherein the method further comprises establishing list links to facilitate linking of two or more objects based on numerical indications and without having to encounter complexities associated with merging of objects, wherein the objects have various shapes.

10. The system of claim 6, further comprising multiple sorting modes to prevent resolution resources from being wasted on sorting, the multiple sorting modes including an arbitrary order mode, a retirement order mode, a front-to-back order mode, and a back-to-front order mode.

11. A non-transitory machine-readable medium comprising instructions which, when executed, cause a machine to:
  receive input data relating to an image in a graphics pipeline of a graphics processing unit (GPU) to be processed and generated into a final image to be displayed on a display device of a computer system;
  obtain geographic primitives from processing the input data, wherein obtaining geographic primitives includes vertex processing, wherein the vertex processing includes
    converting a vertex associated with the input data into a screen and facilitating vertex shading to enable custom transformations for effects of a shape, wherein the effects include deformation of the shape or warping of the shape,
    predictively removing, based on vertex shading, one or more parts of the image that are not expected to be visible in the final image, and
    predictively eliminating, based on predictively removing, unnecessary rasterization and post-processing of one or more primitives that are not expected to appear in the final image, wherein predictive removal and predictive elimination are performed to dynamically adjust a data structure's size such that for each pixel, the data structure's size remains equal to an actual number of elements having low overhead and supporting high variation in list length at different pixels; and
  perform neighbor aggregation of pixels within the geographic primitives, wherein the neighbor aggregation of the pixels includes rendering list texture of the pixels by merging the geographic primitives.

12. The non-transitory machine-readable medium of claim 11, wherein predictive removing is facilitated based on vertex shading, being performed at an early stage in the graphics pipeline, and without having to perform a workload reduction test, wherein the instructions which, when executed, further cause the machine to
  resolve the neighbor aggregation of the pixels to convert the pixels into a single output to be displayed as the final image on the display device, wherein resolving further comprises iterating the pixels to perform one of more of deleting, modifying, sorting one or more of the pixels to generate a final composite value associated with the pixels to be used to convert pixels into the single output.

13. The non-transitory machine-readable medium of claim 11, wherein the instructions which, when executed, further cause the machine to generate a numerical indication of whether a pixel is present or not in the neighbor aggregation, wherein the machine is further to perform vertex processing including predictively removing one or more parts of the input data that are not expected to be visible on the screen or in the final image, wherein the predictive removal of the one or more parts is performed to expedite rendering of the final image by eliminating potential rasterization processing or post-processing of the removed one or more parts, wherein the numerical indication includes a first number indicating the pixel being present and a second number indicating the pixel being absent, wherein each pixel is associated with one or more sets of data including one or more of red/green/blue/alpha (RGBA) values, ancillary data, and other data to be used in rendering the final image.

14. The non-transitory machine-readable medium of claim 11, wherein the instructions which, when executed, further cause the machine to facilitate multiple insertion modes to function with multiple execution threads, wherein the list texture uses lock-free linked list data structure to mediate the multiple insertion modes, the multiple insertion modes including one or more of an in-order insertion mode, an unordered insertion mode, and a sorted insertion mode, wherein the method further comprises establishing list links to facilitate linking of two or more objects based on numerical indications and without having to encounter complexities associated with merging of objects, wherein the objects have various shapes.

15. The non-transitory machine-readable medium of claim 11, wherein the instructions which, when executed, further cause the machine to facilitate sorting modes to prevent resolution resources from being wasted on sorting, the multiple sorting modes including an arbitrary order mode, a retirement order mode, a front-to-back order mode, and a back-to-front order mode.

16. The method of claim 1, wherein the vertex processing further comprises predictively removing one or more parts of the input data that are not expected to be visible on the screen or in the final image, wherein the predictive removal of the one or more parts is performed to expedite rendering of the final image by eliminating potential rasterization processing or post-processing of the removed one or more parts.

17. The system of claim 6, wherein the second logic is further to perform vertex processing including predictively removing one or more parts of the input data that are not expected to be visible on the screen or in the final image, wherein the predictive removal of the one or more parts is performed to expedite rendering of the final image by eliminating potential rasterization processing or post-processing of the removed one or more parts.

18. The method of claim 1, further comprising:
  setting up primitive setup and geometric shading including, wherein setting up includes collecting a plurality of vertices and converting the plurality of vertices into a plurality of triangles, wherein the plurality of triangles are used to generate new primitives; and
  generating a plurality of attributes associated with each pixel of each of the plurality of triangles to facilitate one or more subsequent states in the graphics pipeline.

19. The system of claim 6, wherein the second logic is further to:
  set up primitive setup and geometric shading including, wherein setting up includes collecting a plurality of vertices and converting the plurality of vertices into a plurality of triangles, wherein the plurality of triangles are used to generate new primitives; and
  generate a plurality of attributes associated with each pixel of each of the plurality of triangles to facilitate one or more subsequent states in the graphics pipeline.

20. The non-transitory machine-readable medium of claim 11, wherein the instructions which, when executed, further cause the machine to:
  set up primitive setup and geometric shading including, wherein setting up includes collecting a plurality of vertices and converting the plurality of vertices into a plurality of triangles, wherein the plurality of triangles are used to generate new primitives; and
  generate a plurality of attributes associated with each pixel of each of the plurality of triangles to facilitate one or more subsequent states in the graphics pipeline.

* * * * *